UNITED STATES PATENT OFFICE.

CASIMIR JAMES HEAD AND ROLAND CECIL WILD, OF LONDON, ENGLAND.

METHOD OF TREATING TELLURIDE ORES.

SPECIFICATION forming part of Letters Patent No. 659,670, dated October 16, 1900.

Application filed May 8, 1900. Serial No. 15,954. (No specimens.)

*To all whom it may concern:*

Be it known that we, CASIMIR JAMES HEAD and ROLAND CECIL WILD, subjects of the Queen of Great Britain and Ireland, residing at London, England, have invented a new and Improved Method for the Treatment of Telluride Ores, (for which we have made application for Letters Patent in Great Britain under No. 23,911, bearing date November 30, 1899,) of which the following is a specification.

This invention relates to the treatment of ores containing tellurium and also those in which the tellurium is in the form of tellurides and which ores up to the present do not appear to have been treated for the extraction of the tellurium in a cheap and commercial manner. As such ores frequently also carry considerable quantities of the precious metals, the extraction of which is rendered difficult except by wasteful processes so long as the tellurium remains present in the ore during such treatment, we have found that our process for the extraction and ultimate precipitation and recovery of the tellurium renders such ores more adaptable after such treatment to the extraction of the precious metals by amalgamation or other known cheap and simple modes of extraction and recovery of such precious metals.

To carry our process into effect, the ore or material to be treated is ground or crushed to a suitable state of division and is then lixiviated or digested with a solution of caustic soda or potash. This solution is preferably of about a strength of five per cent. of the alkali salt and requires from two to six hours' digestion with the ores, according to the quantity of tellurium present, which is determined by a previous laboratory test for any specific ore. The rapidity of the reaction with the tellurium is increased by the solution being warmed, say, with exhaust-steam, and agitation during digestion is also useful in case of high-grade ores.

The reaction between the tellurium and the solution may be represented as follows: In many ores the tellurium is found as a telluride of gold ($AuTe_3$) or of silver in a felspar gangue or matrix.

$$9AuTe_3 + 13NaOH = 9NaTe + 3NaTeO_2 + 6H_2 + 4Au.$$

The caustic soda or potash splits up the telluride, dissolving the tellurium, probably, as sodium telluride and sodium tellurite. The tellurium is by this means readily dissolved out of the ore, and the liquor containing it being drawn off by suitable means can be treated for the precipitation of the tellurium after acidifying by passing sulfurous anhydrid (sulfur dioxid) gas through the liquor or by the addition of protochlorid of tin or by other known reagents serving to precipitate tellurium from an acid solution; but in the case of precipitating the tellurium from an alkaline solution the reducing sugars may be employed as the precipitant. The ores thus treated if auriferous or argentiferous are thereby rendered much more amenable to the ordinary processes of amalgamation and to other known processes for the extraction and recovery of the precious metals with higher percentage of economy in such processes by reason of the preliminary extraction of the tellurium, as before described.

Having now described this invention, what we claim, and desire to secure by Letters Patent, is—

1. A process for the extraction of tellurium from telluric ores consisting of the lixiviation and digestion of the ores for a lengthened period of time (two to six hours) in a solution containing about five per cent. of a caustic alkali; the removal of the filtrate; the acidifying of the filtrate; and the precipitation of the tellurium from the filtrate by protochlorid of tin, substantially as described.

2. A process for the extraction of tellurium from telluride auriferous ores, and the preparation thereby of said ores for the better extraction of the precious metal therefrom, consisting of a lixiviation and digestion of the said ores in a solution containing about five per cent. of caustic potash or soda for a lengthened period of two to six hours, the withdrawal of the solution after such digestion from the said ores; the recovery of the tellurium from the solution; substantially as described.

In witness whereof we have hereunto set our hands in presence of two witnesses.

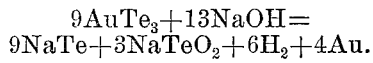
CASIMIR JAMES HEAD.
ROLAND CECIL WILD.

Witnesses:
JOHN C. FELL,
CHARLES CARTER.